United States Patent [19]

Hara et al.

[11] Patent Number: 5,614,666
[45] Date of Patent: Mar. 25, 1997

[54] IDLING ROTATIONAL SPEED CONTROL SYSTEM FOR INTERNAL COMBUSTION ENGINES

[75] Inventors: Fumio Hara; Takashi Isobe, both of Wako, Japan

[73] Assignee: Honda Giken Kogyo Kabushiki Kaisha, Tokyo, Japan

[21] Appl. No.: 628,164

[22] Filed: Apr. 5, 1996

[30] Foreign Application Priority Data

Apr. 7, 1995 [JP] Japan .................................. 7-107889

[51] Int. Cl.$^6$ .......................... F02D 19/02; G01M 15/00
[52] U.S. Cl. .................. 73/118.1; 73/117.3; 123/339.15; 364/431.03
[58] Field of Search .................. 73/116, 117.2, 73/117.3, 118.1; 364/431.03; 123/339.15

[56] References Cited

U.S. PATENT DOCUMENTS

| | | | |
|---|---|---|---|
| 4,508,076 | 4/1985 | Oda et al. | 123/339 |
| 4,509,477 | 4/1985 | Takao et al. | 123/339 |
| 4,513,710 | 4/1985 | Kobayashi et al. | 123/339 |
| 4,545,349 | 10/1985 | Ito et al. | 123/339 |
| 4,580,535 | 4/1986 | Danno et al. | 123/339 |
| 4,589,390 | 5/1986 | Wazaki et al. | 123/339 |
| 4,696,272 | 9/1987 | Kato et al. | 123/339 |
| 4,782,690 | 11/1988 | Terasaka | 73/116 |

FOREIGN PATENT DOCUMENTS

| | | | |
|---|---|---|---|
| 358048752 | 3/1983 | Japan | 123/339.15 |
| 64-77729 | 3/1989 | Japan . | |
| 4-43841 | 2/1992 | Japan . | |

*Primary Examiner*—Richard Chilcot
*Assistant Examiner*—George M. Dombroske
*Attorney, Agent, or Firm*—Armstrong, Westerman, Hattori, McLeland & Naughton

[57] ABSTRACT

An idling rotational speed control system for an internal combustion engine installed in a vehicle including an air-fuel ratio sensor arranged in the exhaust system, and an ECU which corrects the air-fuel ratio of an air-fuel mixture supplied to the engine in a feedback manner responsive to an output from the air-fuel ratio sensor, by using an air-fuel ratio correction amount calculated according to the output from the air-fuel ratio sensor. The rotational speed of the engine is detected, and the ECU controls the rotational speed of the engine during idling to a desired value in a feedback manner responsive to the detected rotational speed of the engine. The ECU determines whether the idling rotational speed control system is abnormal, based on the detected rotational speed of the engine and a control parameter used for the control of the rotational speed of the engine during idling. The idling rotational speed control system includes at least one of a brake system operation sensor for detecting operation of the brake system, and a throttle valve opening sensor for detecting opening of the throttle valve. When at least one of conditions is satisfied that the brake system is operated, the opening of the throttle valve exceeds a predetermined value, and the air-fuel ratio correction amount falls outside a predetermined range, the abnormality determination is inhibited.

16 Claims, 6 Drawing Sheets

IDLING ROTATIONAL SPEED CONTROL SYSTEM FOR INTERNAL COMBUSTION ENGINES

BACKGROUND OF THE INVENTION

1. Field of the Invention

This invention relates to an idling rotational speed control system for internal combustion engines, and more particularly to an idling rotational speed control system which has an abnormality-determining function.

2. Description of the Related Art

There is conventionally known an idling rotational speed control system for internal combustion engines, for example, in Japanese Laid-Open Patent Publication (Kokai) No. 64-77729, which carries out feedback control of the engine rotational speed to a low desired engine rotational speed in order to prevent engine stalling, when the engine rotational speed is decelerated or idling.

Further, there is also conventionally known a method of abnormality determination, for example, from Japanese Laid-Open Patent Publication (Kokai) No. 4-43841, which determines that an idling rotational speed control system is abnormal when the engine rotational speed falls outside a predetermined range including a desired engine rotational speed as a central value thereof during feedback control of the engine rotational speed and at the same time a control parameter used in the feedback control (e.g. a control current value applied to an electromagnetic valve for controlling an amount of auxiliary air) falls outside a predetermined range.

When the driver of an automotive vehicle in which the engine is installed carries out so-called "pumping" of the brake, i.e., repeatedly applies the brakes (the brake system is repeatedly alternately operated and stopped), however, the engine rotational speed can increase depending on the relationship between the capacity of a brake master cylinder of the brake system and the volume of the intake pipe of the engine. As a result, if the afore-mentioned conventional abnormality determination method is employed, there is a fear that it is erroneously determined that the idling rotational speed control system is abnormal although it is actually functioning normally.

Further, when the air-fuel ratio of an air-fuel mixture supplied to the engine becomes overly rich or overly lean, the engine rotational speed feedback control has degraded convergency of the engine rotational speed to the desired engine rotational speed, which can result in an erroneous determination that the idling rotational speed control system is abnormal although it is actually functioning normally.

Still further, in a manual transmission type vehicle, the vehicle is sometimes driven with a clutch thereof in a half-engaged state and an accelerator pedal of the vehicle not stepped on during traveling at an extremely low speed, on such occasions as road congestion or waiting for a signal light. In such a half-engaged state of the clutch, the engine rotational speed decreases, and then the idling rotational speed control system operates to increase the engine rotational speed. However, then the idling rotational speed control system can be erroneously determined to be abnormal, depending on the feedback control response lag, load applied on the engine due to the half-engaged state of the clutch, and the duration of the half-engaged state, though it is actually functioning normally.

SUMMARY OF THE INVENTION

The object of the present invention is to provide an idling rotational speed control system for internal combustion engines which is capable of preventing an erroneous determination that the idling rotational speed control system is abnormal although it is actually functioning normally, to thereby accurately carry out abnormality determination thereof.

To attain the above object, according to a first aspect of the invention, there is provided an idling rotational speed control system for an internal combustion engine installed in a vehicle having a brake system, the engine having an intake system, an exhaust system, a throttle valve arranged in the intake system, an air-fuel ratio sensor arranged in the exhaust system, and air-fuel ratio-correcting means for correcting an air-fuel ratio of an air-fuel mixture supplied to the engine in a feedback manner responsive to an output from the air-fuel ratio sensor, by using an air-fuel ratio correction amount calculated according to the output from the air-fuel ratio sensor, the idling rotational speed control system comprising:

engine rotational speed-detecting means for detecting a rotational speed of the engine;

rotational speed control means operable during idling of the engine, for controlling the rotational speed of the engine to a desired value in a feedback manner responsive to the rotational speed of the engine detected by the engine rotational speed-detecting means;

abnormality-determining means for determining whether the idling rotational speed control system is abnormal, based on the rotational speed of the engine detected by the engine rotational speed-detecting means, and a control parameter used by the rotational speed control means;

at least one of brake system operation-detecting means for detecting operation of the brake system, and throttle valve opening-detecting means for detecting opening of the throttle valve; and inhibiting means operable when at least one of conditions is satisfied that the brake system is operated, the opening of the throttle valve exceeds a predetermined value, and the air-fuel ratio correction amount falls outside a predetermined range, for inhibiting abnormality determination by the abnormality-determining means.

Preferably, the condition that the brake system is operated is satisfied when the brake system is repeatedly alternately operated and stopped.

Also preferably, the predetermined value of the opening of the throttle valve is a value at which the rotational speed of the engine becomes substantially equal to a predetermined upper threshold value used for determining abnormality of the idling rotational speed control system.

Preferably, the predetermined value of the opening of the throttle valve is a value assumed when the throttle valve is in an almost fully closed state.

Also preferably, the condition that the air-fuel ratio correction amount falls outside the predetermined range is satisfied when the air-fuel ratio correction amount has continuously remained outside a range defined by predetermined upper and lower limit values over a predetermined time period.

To attain the object, according to a second aspect of the invention, the idling rotational speed control system comprises at least one of brake system operation-detecting means for detecting operation of the brake system, throttle valve opening-detecting means for detecting opening of the throttle valve, and intake pressure-detecting means for detecting intake pressure in the intake system at a location downstream of the throttle valve; and inhibiting means operable when at least one of conditions is satisfied that the brake system is operated, the intake pressure exceeds a predetermined value, the opening of the throttle valve exceeds a predetermined value, and the air-fuel ratio correction amount falls outside a predetermined range, for inhibiting abnormality determination by the abnormality-determining means.

Preferably, the vehicle includes an automatic transmission having a clutch, and the predetermined value of the intake pressure is a lower limit value assumed when the clutch is in a half-engaged state.

More preferably, the predetermined value of the intake pressure is set to a larger value as atmospheric pressure increases.

The above and other objects, features and advantages of the invention will become more apparent from the following detailed description taken in conjunction with the accompanying drawings.

DETAILED DESCRIPTION

The invention will now be described in detail with reference to the drawings showing an embodiment thereof.

Figure 1:
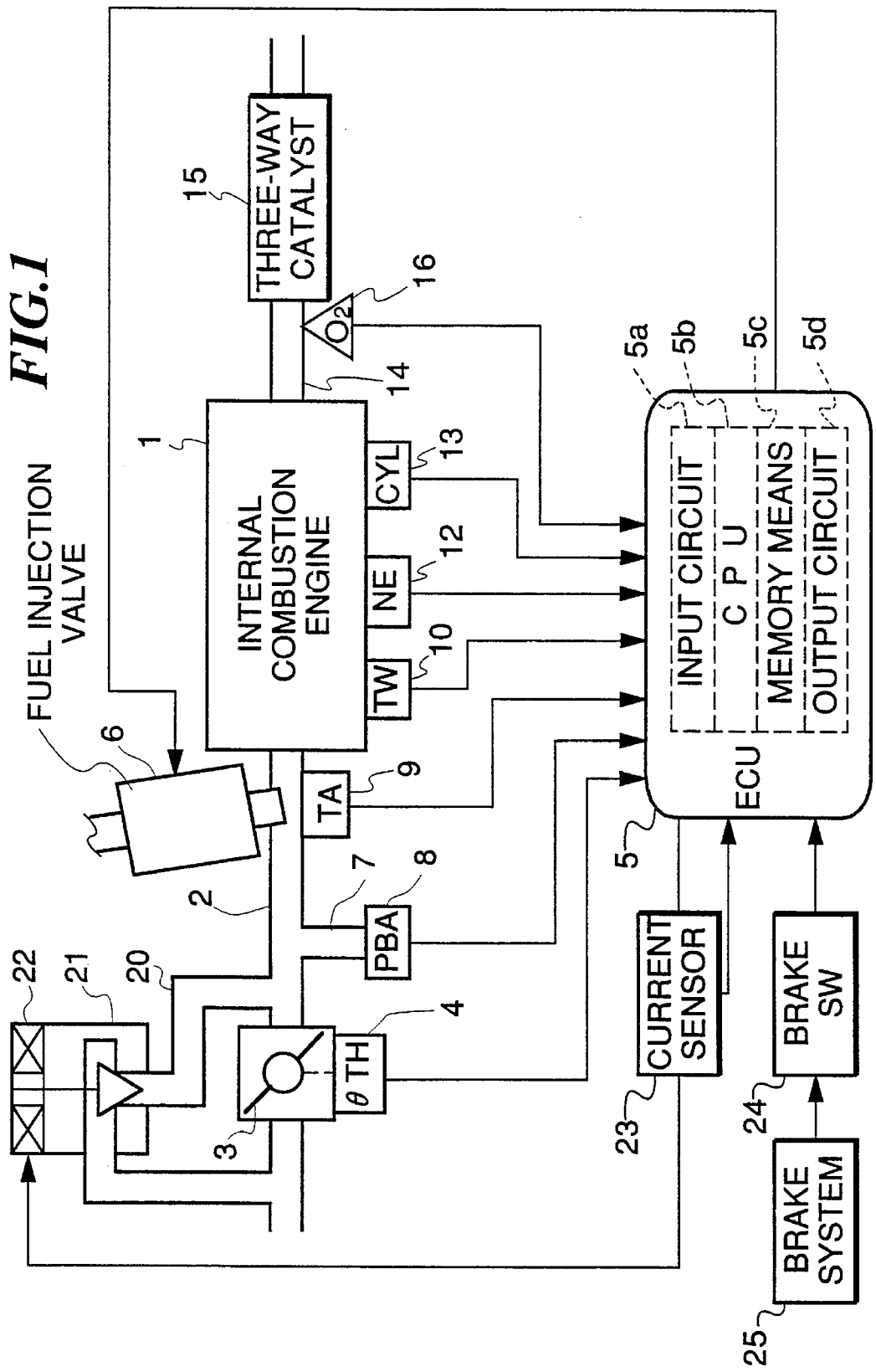
FIG. 1 is a block diagram schematically showing the whole arrangement of an internal combustion engine and an idling rotational speed control system therefor, according to an embodiment of the invention.

Referring first to FIG. 1, there is illustrated the whole arrangement of an internal combustion engine (hereinafter simply referred to as "the engine") and an idling rotational speed control system therefor, according to an embodiment of the invention.

In the figure, reference numeral 1 designates an engine, which has an intake pipe 2 connected to the cylinder block thereof, in which a throttle valve 3 is arranged. A throttle valve opening (θTH) sensor 4 is connected to the throttle valve 3 for generating an electrical signal indicative of the sensed throttle valve opening θTH to an electronic control unit (hereinafter referred to as "the ECU") 5.

Fuel injection valves 6, only one of which is shown, are inserted into the intake pipe 2 at locations intermediate between the cylinder block of the engine 1 and the throttle valve 3 and slightly upstream of respective intake valves, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is communicated with the interior of the intake pipe 2 via a conduit 7 at a location immediately downstream of the throttle valve 3, for sensing absolute pressure (PBA) within the intake pipe 2, for supplying an electrical signal indicative of the sensed absolute pressure PBA to the ECU 5. Further, an intake air temperature (TA) sensor 9 is inserted into the intake pipe 2 at a location downstream of the PBA sensor 8, for supplying an electrical signal indicative of the sensed intake air temperature TA to the ECU 5.

An engine coolant temperature (TW) sensor 10, which may be formed of a thermistor or the like, is mounted in the cylinder block of the engine 1 which is filled with an engine coolant, for supplying an electrical signal indicative of the sensed engine coolant temperature TW to the ECU 5.

An engine rotational speed (NE) sensor 12 and a cylinder-discriminating sensor (hereinafter referred to as "the CYL sensor") 13 are arranged to face a camshaft or a crankshaft of the engine 1, neither of which is shown. The NE sensor 12 generates a signal pulse (hereinafter referred to as "a TDC signal pulse") at each of predetermined crank angles (e.g., whenever the crankshaft rotates through 180 degrees when the engine is of the 4-cylinder type) which each correspond to a predetermined crank angle before a top dead center position (TDC) of each cylinder corresponding to the start of the intake stroke of the cylinder. The CYL sensor 13 generates a signal pulse (hereinafter referred to as "a CYL signal pulse") at a predetermined crank angle of a particular cylinder of the engine 1. The CYL signal pulse and TDC signal pulse are supplied to the ECU 5.

A three-way catalyst 15 is arranged in an exhaust pipe 14 of the engine 1, for purifying noxious components in exhaust gases emitted from the engine 1, such as HC, CO, and NOx. An oxygen concentration sensor (hereinafter referred to as "the $O_2$ sensor") 16 as an air-fuel ratio sensor is arranged in the exhaust pipe 14 at a location upstream of the catalytic converter 15, which detects the concentration of oxygen present in exhaust gases and supplies an electrical signal indicative of the sensed oxygen concentration to the ECU 5.

A bypass passage 20 is provided for the intake pipe 2, which bypasses the throttle valve 3 and has an electromagnetic valve 21 arranged thereacross. The electromagnetic valve 21 has a solenoid 22 thereof electrically connected to the ECU 5 and an amount of electric current IACT supplied thereto is controlled by the ECU 5. The electromagnetic valve 21 is constructed such that the degree of opening thereof is linearly increased as the control current IACT increases. Further, an electric current sensor 23 is provided for detecting the amount of control current IACT and supplying a signal indicative of the sensed amount of control current IACT to the ECU 5.

Further connected to the ECU 5 are a brake switch 24 for detecting the operation of a brake pedal, not shown, of a brake system 25 of a vehicle in which the engine 1 is installed, various other sensors, not shown, such as an atmospheric pressure sensor for detecting atmospheric pressure, and a vehicle speed sensor for detecting the traveling speed of the vehicle, and switches, not shown, such as an accelerator switch for detecting the operation of an accelerator pedal of the vehicle, a power-steering switch for detecting the operation of a power steering device of the vehicle, and an air-conditioner switch for detecting the operation of an air conditioner of the vehicle, signals indicative of the sensed parameter values being supplied to the ECU 5.

The ECU 5 is comprised of an input circuit 5a having the functions of shaping the waveforms of input signals from various sensors, shifting the voltage levels of sensor output signals to a predetermined level, converting analog signals from analog-output sensors to digital signals, and so forth, a central processing unit 5b (hereinafter referred to as the "the CPU"), memory means 5c storing various operational programs which are executed by the CPU 5b, and for storing results of calculations therefrom, etc., an output circuit 5d which outputs driving signals to the fuel injection valves 6 and the electromagnetic valve 21, etc.

The CPU 5b operates in response to signals from various engine parameter sensors including those mentioned above to determine operating conditions in which the engine 1 is operating, such as an air-fuel ratio feedback control region in which air-fuel ratio control is carried out in response to the oxygen concentration in exhaust gases, and air-fuel ratio open-loop control regions, and calculates, based upon the determined engine operating conditions, a fuel injection time period TOUT for each of the fuel injection valves 6, in synchronism with generation of TDC signal pulses, by the use of the following equation (1):

$$TOUT = TI \times KO2 \times K1 + K2 \qquad (1)$$

where TI represents a basic value of the fuel injection period TOUT, which is determined according to the engine rotational speed NE and the intake pipe absolute pressure PBA, by the use of a TI map, not shown, stored in the memory means 5c.

KO2 represents an air-fuel ratio correction coefficient calculated based on an output from the $O_2$ sensor 16, which is set to such a value that the air-fuel ratio (oxygen concentration) of an air-fuel mixture detected by the $O_2$ sensor 16 becomes equal to a desired air-fuel ratio when the engine 1 is operating in the air-fuel ratio feedback control region, while it is set to predetermined values corresponding to the respective air-fuel ratio open-loop control regions of the engine 1 when the engine 1 is in these open-loop control regions. The air-fuel ratio correction coefficient KO2 applied during the air-fuel ratio feedback control is set based on well-known proportional control and integral control. When the KO2 value has continuously fallen outside a range defined by predetermined upper and lower limit values over a predetermined time period (a state in which the KO2 value is held at the upper or lower limit value), a limit flag FKO2LMT is set to "1" to indicate that the above state exists. When the engine 1 is idling, the air-fuel ratio is feedback-controlled.

K1 and K2 represent other correction coefficients and correction variables, respectively, which are set according to engine operating parameters to such values as optimize operating characteristics of the engine, such as fuel consumption and engine accelerability.

Figure 2:
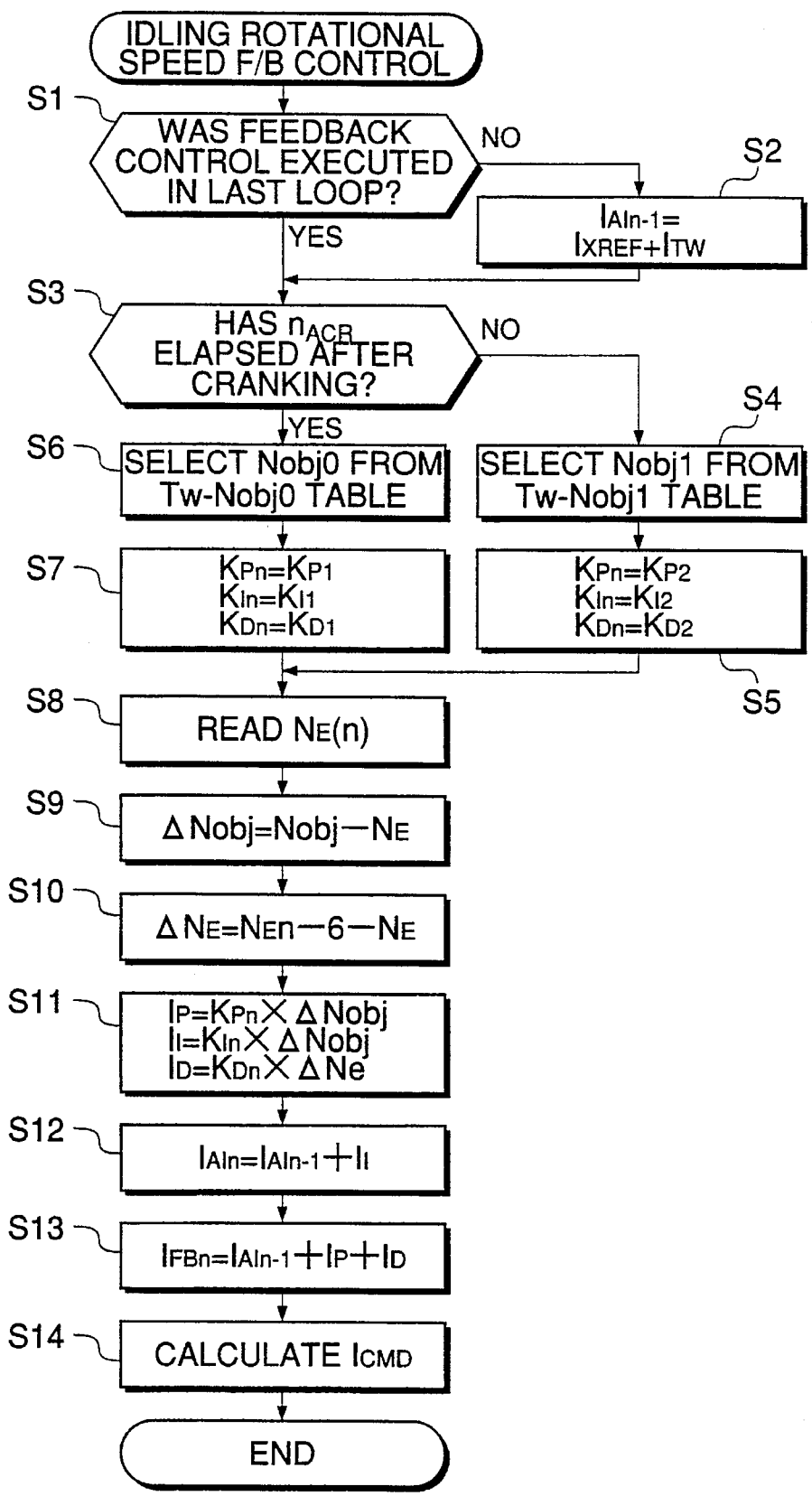
FIG. 2 is a flowchart showing a program for carrying out feedback control of the idling rotational speed.
Figure 3A:
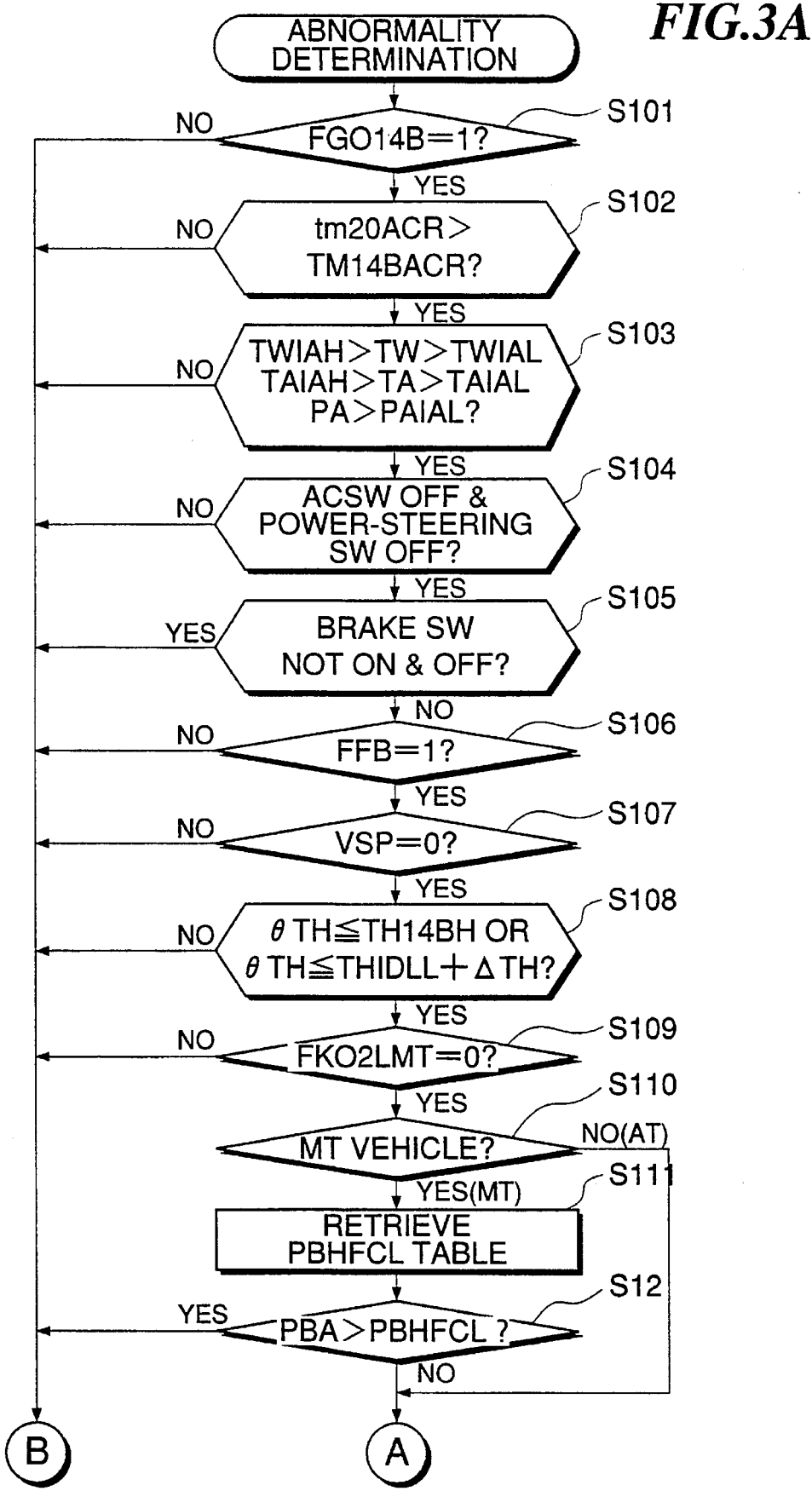
FIG. 3A is a flowchart showing a program for carrying out abnormality determination of the idling rotational speed control system.
Figure 3B:
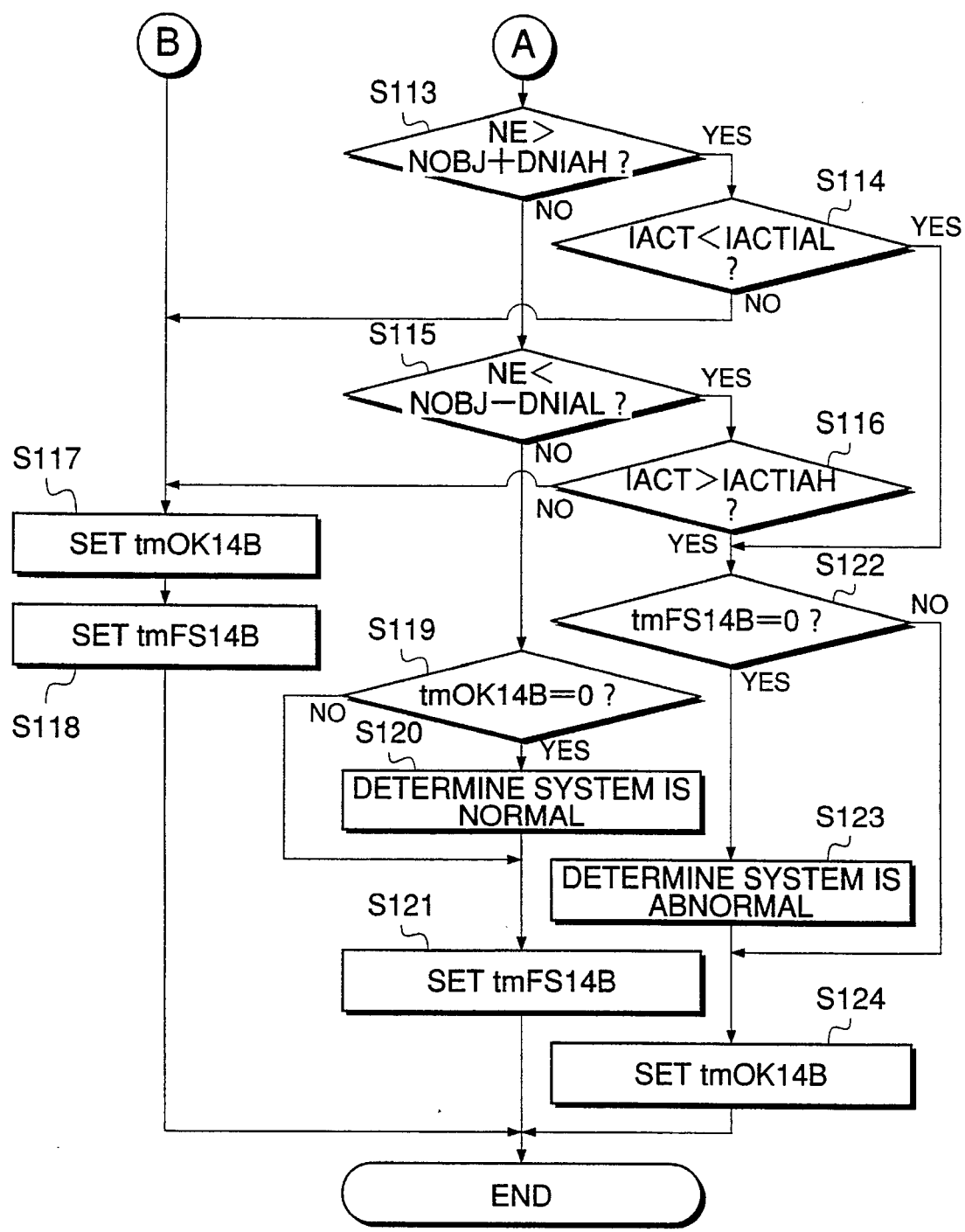
FIG. 3B is a continued part of the FIG. 3A flowchart.

Further, the CPU 5b carries out idling rotational speed feedback control by controlling the control current IACT supplied to the electromagnetic valve 21 so that the detected engine rotational speed NE becomes equal to a desired engine rotational speed NOBJ according to a program of FIG. 2, and carries out a determination as to abnormality in an idling rotational speed control system formed of the electromagnetic valve 21, bypass passage 20, etc. according to a program of FIGS. 3A and 3B.

More specifically, the ECU 5 calculates a valve opening command value ICMD for the electromagnetic valve 21 by the use of the following equation (2):

$$ICMD = (IFBn + IE + IPS + IAT + IAC) \times KPAD + IPA \qquad (2)$$

where IFBn represents a feedback control value determined by an idling rotational speed feedback control program, described hereinafter.

IE represents an electrical load-dependent correction value which is determined in accordance with an amount of electrical load on the battery, IPS a power steering-dependent correction value which is determined depending on whether the power-steering switch is closed or open, IAT a gear position-dependent correction value which is determined depending on whether or not a shift lever of an automatic transmission of the vehicle is in a D range, and IAC an air-conditioner-dependent correction value which is determined depending on whether the air-conditioner switch is closed or open. These are external load-dependent correction values which are determined depending on external loads on the engine. Further, KPAD represents an atmospheric pressure-dependent correction coefficient which is set to a larger value as the atmospheric pressure decreases to compensate for variation in the amount of air taken in through the electromagnetic valve 21, which takes place with a decrease in the atmospheric pressure. IPA represents an error correction coefficient for correcting variation in the intake air amount taken in through the intake air system other than the electromagnetic valve 21, such as the throttle valve 3 and a fast idle control valve, not shown, which takes place with a change in the atmospheric pressure.

Thus, the ECU 5 generates a driving signal based on the valve opening command value ICMD calculated as above to the electromagnetic valve 21, which in turn opens the bypass passage 20 to a degree corresponding to the value ICMD.

The idling rotational speed feedback control according to the present embodiment will be described in detail with reference to a program shown in FIG. 2. This program is executed by the CPU 5b when predetermined preconditions for the idling rotational speed feedback control are satisfied, in synchronism with generation of each TDC signal pulse.

First, at a step S1, it is determined whether an integral term IAIn-1 of the feedback control value IFBn to be calculated at a step S12, referred to hereinafter, should be initialized in the present loop. In other words, it is determined at the step S1 whether or not the feedback control was executed in the immediately preceding loop.

If the answer is negative (NO), i.e. if the present loop is the first loop immediately after transition of the engine operating condition to an idling rotational speed feedback control region, the integral term IAIn-1 is initialized at the following step S2 in a manner described below, and then the program proceeds to a step S3. On the other hand, if the answer is affirmative (YES), i.e. if the present loop is not the first loop after transition of the engine operating condition to the idling rotational speed feedback control region, the program proceeds to the step S3 without initializing the integral term IAIn-1.

Since the present loop is the first loop after transition from a cranking mode of the engine, in which idling rotational speed open loop control is carried out, to an idling mode of the engine, the program proceeds through the step S2 to the step S3.

The initialization of the integral term IAIn-1 at the step S2 is carried out by adding a coolant temperature-dependent correction value ITW set in accordance with the engine coolant temperature TW to a learned value (e.g. an average value) IXREF of the integral term IAIn which is obtained by a routine, not shown, when predetermined conditions are satisfied. The coolant temperature/dependent correction value ITW is set such that values ITW1 to ITWm correspond, respectively, to engine coolant temperature values TW1 to TWm. In general, the value ITW decreases with a rise in the engine coolant temperature TW.

At the step S3, it is determined whether or not the number of TDC signal pulses counted after completion of the cranking mode exceeds a predetermined number nACR, i.e., whether or not a predetermined time period has elapsed after completion of the cranking mode.

If the answer is negative (NO), i.e. if the number of TDC signal pulses counted after completion of cranking does not exceed the predetermined number nACR, setting of a desired idling engine rotational speed Nobj, and determination of a control gain, which determines the feedback gain, are carried out at steps S4 and S5.

More specifically, at the step S4, a higher desired engine rotational speed value is set as the desired idling engine rotational speed Nobj, i.e., the higher desired engine rotational speed Nobj1 is selected from a TW–Nobj1 table, not shown, in accordance with a value of the engine coolant temperature TW detected at that time.

At the step S5, a coefficient KPn for determining a proportional term control gain, a coefficient KIn for determining an integral term control gain, and a coefficient KDn for determining a differential term control gain are set to predetermined values KP2, KI2, and KD2, respectively. In the memory means 5c, there are stored the predetermined value KP2 and a predetermined value KP1 (KP1>KP2) selected at a step S7, referred to hereinafter, as KPn, the predetermined value KI2 and a predetermined value KI1 (KI1>KI2) selected at the step S7 as KIn, and the predetermined value KD2 and a predetermined value KD1 (KD1>KD2) selected at the step S7 as KDn. Following the step S5, the program proceeds to a step S8.

As described above, as each of the control gains, two kinds of values are selected. Lower control gains are selected during a time period after completion of the cranking mode and before counting-up of the predetermined number nACR of TDC signal pulses, i.e., while the combustion of the engine is unstable, to thereby prevent hunting or fluctuation of the engine rotational speed NE.

At the step S8, the actual engine rotational speed detected by the NE sensor 12 is read in, and then at steps S9 and S10, calculations are made of a difference $\Delta$Nobj between the desired idling engine rotational speed Nobj and the actual engine rotational speed NE, and a difference $\Delta$NE between the engine rotational speed NEn-6 detected 6 TDC signal pulses earlier and the actual engine rotational speed NE detected in the present loop, i.e., a variation in the engine rotational speed.

Then, at the following step S11, calculations are made of a proportional term IP and a differential term ID used for calculation of the feedback control value IFBn, and a correction term II for correcting the integral term IAIn, in accordance with the difference $\Delta$Nobj and the variation $\Delta$NE calculated at the steps S9 and S10. More specifically, the proportional term IP is obtained by multiplying the difference $\Delta$Nobj by the coefficient KPn, the differential term ID by multiplying the variation $\Delta$NE by the coefficient KDn, and the correction term II by multiplying the difference $\Delta$Nobj by the coefficient Kin, respectively.

At the following step S12, the integral term IAIn in the present loop is calculated by adding the correction value II obtained at the step S11 to the value IAIn-1 (the value initialized at the step S2 or the value obtained in the immediately preceding loop after initialization). Then, at a step S13, the feedback control value IFBn in the present loop is calculated by adding the proportional term IP and the differential term ID to the integral term IAIn obtained at the step S12. At the following step S14, the valve opening command value ICMD is calculated in accordance with the equation (2) by the use of the IFBn calculated at the step S13, followed by terminating the present routine.

If the answer to the question of the step S3 is affirmative (YES), i.e., if it is determined that the number of TDC signal pulses counted after completion of the cranking mode exceeds the predetermined number nACR, a value of the lower desired engine rotational speed Nobj0, referred to above, is selected at the step S6 from the TW–Nobj0 table as the desired idling engine rotational speed Nobj in accordance with the engine coolant temperature TW detected at that time. Then, at the following step S7, as the coefficient KPn, KIn, and KDn, the aforesaid predetermined values KP1, KI1, and KD1 are selected, followed by executing the above described steps S8 to S11. Then, the program proceeds to the step S12.

Next, the determination as to abnormality in the idling rotational speed control system will be described with reference to the program of FIGS. 3A and 3B. This program is executed as background processing.

At a step S101 in FIG. 3A, it is determined whether or not a monitor permission flag FG014B assumes "1" to indicate that execution of the abnormality determination is permitted. If the answer is affirmative (YES), it is determined at a step S102 whether or not the count of an up-counting timer tm20ACR which starts counting a time period elapsed after completion of starting of the engine 1 exceeds a predetermined time period TM14BACR (e.g. 120 seconds). If tm20ACR>TM14BACR holds, it is determined at a step S103 whether or not the engine coolant temperature TW falls within a range defined by predetermined upper and lower limit values TWIAH and TWIAL (e.g. 100° C. and 80° C., respectively), whether or not the intake air temperature TA falls within a range defined by predetermined upper and lower limit values TAIAH and TAIAL (e.g. 80° C. and 0° C., respectively), and at the same time whether or not the atmospheric pressure PA exceeds a predetermined lower limit value PAIAL (e.g., 580 mmHg). If TWIAH>TW>TWAIL, TAIAH>TA>TAIAL, and PA>PAIAL hold at the same time, then it is determined at a step S104 whether or not the accelerator switch is off, i.e., the accelerator pedal has not been stepped on, and at the same time the power-steering switch is off, i.e., the power steering device of the vehicle is not operative.

If the answer is affirmative (YES), i.e., if the accelerator pedal has not been and at the same time the power steering device is not operative, it is determined at a step S105 whether or not the brake switch 24 has been repeatedly turned on and off, i.e., whether or not brake pumping is being carried out. If the answer is negative (NO), i.e., if brake pumping is not being carried out, it is determined at a step S106 whether or not a feedback flag FFB assumes "1" to indicate that the engine rotational speed is being feedback-controlled during idling of the engine. If FFB=1 holds, it is determined at a step S107 whether or not the vehicle speed VSP is equal to zero. If VSP=0 holds, it is determined at a step S108 whether or not the throttle valve opening $\theta$TH is equal to or less than a first predetermined value TH14BH which is set according to battery voltage or equal to or less than a value obtained by adding together a second predetermined opening value THIDLL and a predetermined very small value $\Delta$TH. If $\theta$TH$\leq$TH14BH or $\theta$TH$\leq$(THIDLL+$\Delta$TH) holds, then it is determined at a step S109 whether or not the limit flag FKO2LMT assumes "1".

The first predetermined opening TH14BH is set to a value at which the engine rotational speed NE becomes almost equal to an upper threshold value (NOBJ+DNIAH) used for abnormality determination, referred to below, and the second predetermined opening THIDLL is set to a value at which the throttle valve 3 is in an almost fully closed state.

The reason why the throttle valve opening is compared with the first predetermined opening TH14BH or the second predetermined opening THIDLL is that the relationship between the value TH14BH and the value THIDLL+ΔTH is variable.

If any of the answers to the questions at the steps S101 to S104 and S106 to S109 is negative (NO) or if the answer to the question at the step S105 is affirmative (YES), the program proceeds to a step S117 in FIG. 3B, wherein a down-counting timer tmOK14B for normality determination is set to a predetermined time period TOK14B (e.g. 5 seconds) and started, and then a down-counting timer tmFS14B for abnormality determination is set to a predetermined time period TFS14B (e.g. 20 seconds) and started at a step S118, followed by terminating the present routine.

Figure 4:
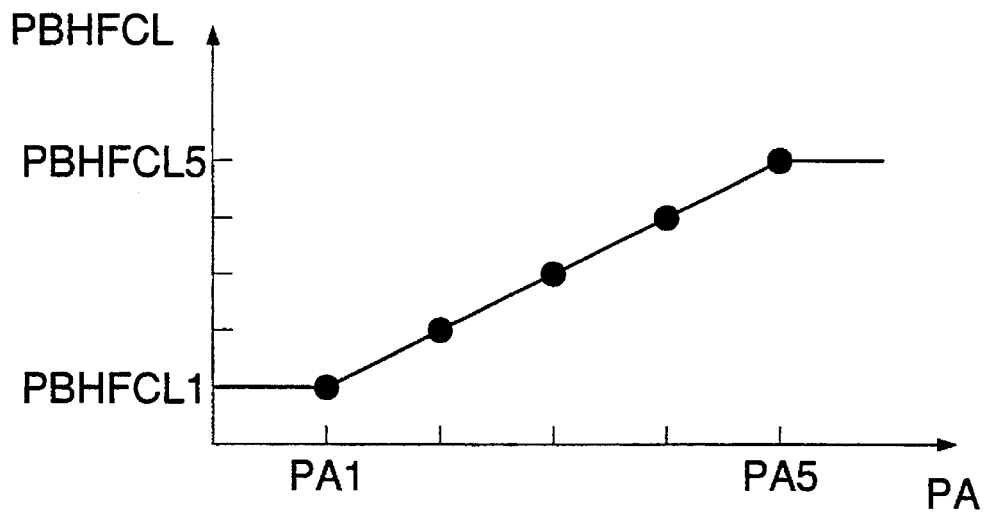
FIG. 4 shows a table for determining a parameter to be used in the FIG. 3A processing.

If the answers to the questions at the steps S101 to S104 and S106 to S109 are all affirmative (YES) and at the same time the answer to the question at the step S105 is negative (NO), it is determined at a step S110 in FIG. 3A whether or not the vehicle is a vehicle with a manual transmission (MT vehicle). If the vehicle is not an MT vehicle, i.e., it is an automatic transmission type vehicle, the program jumps to a step S113 in FIG. 3B. On the other hand, if the vehicle is an MT vehicle, a PBHFCL table is retrieved based on the detected atmospheric pressure PA to determine a predetermined intake pressure value PBHFCL at a step S111, and then it is determined at a step S112 whether or not the intake pipe absolute pressure PBA is greater than the predetermined intake pressure value PBHFCL. The PBHFCL table is set, as shown in FIG. 4, such that a larger predetermined intake pressure value PBHFCL is read out as the atmospheric pressure PA increases. In FIG. 4, for example, PA1 and PA5 indicate 580 mmHg and 760 mmHg, respectively, and PBHFCL1 and PBHFCL5 indicate 500 mmHg and 540 mmHg, respectively.

If the answer to the question at the step S112 is negative (NO), i.e., if PBA≦PBHFCL, the program proceeds to the step S113, wherein it is determined whether or not the engine rotational speed NE is greater than the upper threshold value (NOBJ+DNIAH) obtained by adding together the desired idling rotational speed value NOBJ and a predetermined rotational speed value DNIAH (e.g. 250 rpm). If NE>(NOBJ+DNIAH) holds, it is determined at a step S114 whether or not the control current IACT supplied to the electromagnetic valve 21 is less than a predetermined lower limit value IACTIAL. If IACT≧IACTIAL holds, the program proceeds to the step S117. On the other hand, if IACT<IACTIAL holds, the program proceeds to a step S122, wherein it is determined whether or not the count of the timer tmFS14B for abnormality determination started at the step S118 is equal to "0". In the first loop of execution of the step S122, tmFS14B>0 holds, and therefore the program jumps to a step S124, wherein the timer tmOK14B for normality determination is set and started, similarly to the step S117, followed by terminating the present routine.

If tmFS14B=0 holds, i.e. if the answers to the questions at the steps S113 and S114 are both affirmative (YES), which means that a state in which the engine rotational speed NE is greater than the upper threshold value (NOBJ+DNIAH) and at the same time the control current IACT is less than the lower threshold value IACTIAL has continued over a predetermined time period TFS14B, it is determined at a step S123 that abnormality exists in the idling rotational speed control system, followed by the program proceeding to the step S124.

On the other hand, if the answer to the question at the step S113 is negative (NO), i.e. if NE≦(NOBJ+DNIAH), it is determined at a step S115 whether or not the engine rotational speed NE is less than a lower threshold value (NOBJ−DNIAL) obtained by subtracting a predetermined rotational speed value DNIAL (e.g. 200 rpm) from the desired idling rotational speed value NOBJ. If NE<(NOBJ−DNIAL) holds, it is determined at a step S116 whether or not the control current IACT supplied to the electromagnetic valve 21 is greater than a predetermined upper limit value IACTIAH. If IACT≦IACTIAH, the program proceeds to the step S117, whereas if IACT>IACTIAH, the program proceeds to the step S122.

If tmFS14B=0 holds, i.e., if the answers to the questions at the steps S115 and S116 are both affirmative (YES), which means that a state in which the engine rotational speed NE is lower than the lower threshold value (NOBJ−DNIAL) and at the same time the control current IACT is greater than the predetermined upper limit value IACTIAH has continued over the predetermined time period TFS14B, it is determined at the step S123 that abnormality exists in the idling rotational speed control system.

If the answer to the question at the step S115 is negative (NO), i.e., if NE≧(NOBJ−DNIAL), the program proceeds to a step S119, wherein it is determined whether or not the count of the timer tmOK14B for normality determination is equal to "0". In the first loop of execution of the step S119, tmOK14B>0 holds, and therefore the program jumps to a step S121, wherein the timer TMFS14B for abnormality determination is set and started, similarly to the step S118, followed by terminating the present routine.

If tmOK14B=0 holds, which means that a state in which (NOBJ−DNIAL)≦NE≦(NOBJ+DNIAH) has continued over the predetermined time period TOK14B, it is determined at a step S120 that the idling rotational speed control system is normal, followed by the program proceeding to the step S121.

As described above, according to the present embodiment, when it is determined at the step S105 that brake pumping is being carried out, execution of the abnormality determination at the steps S113 et seq. is inhibited. As a result, it is possible to prevent an erroneous determination that abnormality exists in the idling rotational speed control system although the system is functioning normally, even when an increase occurs in the engine rotational speed NE caused by the pumping brake. Further, also when it is determined at the step S108 that the throttle valve is slightly opened, execution of the abnormality determination is inhibited. As a result, even when the driver lightly depresses the accelerator pedal to slightly open the throttle valve and hence the engine rotational speed NE increases, an erroneous determination that abnormality exists in the idling rotational speed control system can be prevented.

Further, when it is determined at the step S109 that the air-fuel ratio correction coefficient KO2 is held at the upper or lower limit value, i.e., if FKO2LMT=1, execution of the abnormality determination is inhibited. As a result, it is possible to prevent an erroneous determination that abnormality exists in the idling rotational speed control system though the system is functioning normally, even when the convergency of the engine rotational speed NE to the desired engine rotational speed is degraded due to overriching or overleaning of the air-fuel ratio of a mixture supplied to the engine.

Further, in a MT vehicle, when it is determined at the steps S110 to S112 that the intake pipe absolute pressure PBA is higher than the predetermined pressure value PBHFCL, it is determined that the clutch is in a half-engaged state, and execution of the abnormality determination is inhibited. As a result, it is possible to prevent an erroneous determination that abnormality exists in the idling rotational speed control system, even when there occur fluctuations of the engine rotational speed NE caused by the half-engaged state of the clutch.

Next, a variation of the embodiment described above will be described with reference to FIG. 5.

Figure 5:
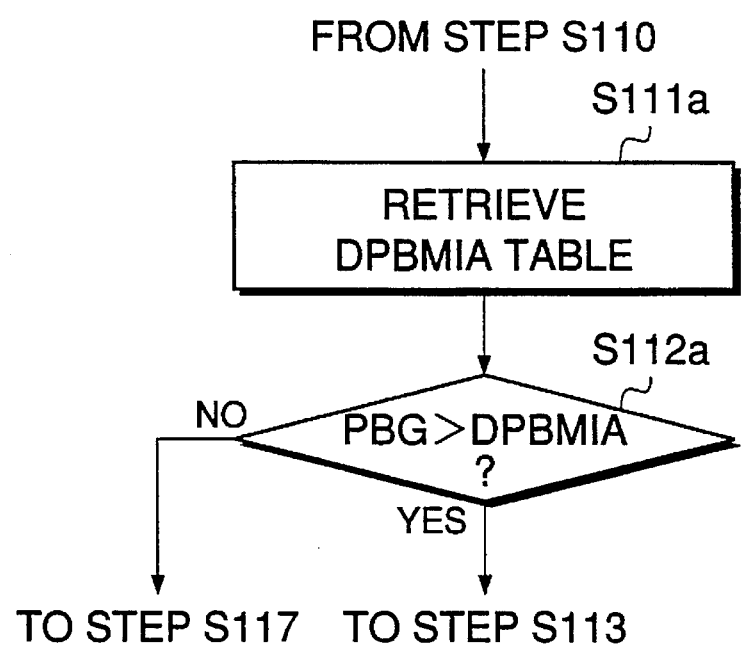
FIG. 5 is a section of a flowchart showing a variation of the FIG. 3A flowchart.

According to the variation, the steps S111 and S112 in FIG. 3A are replaced by steps S111a and S112a, as shown in FIG. 5.

Figure 6:
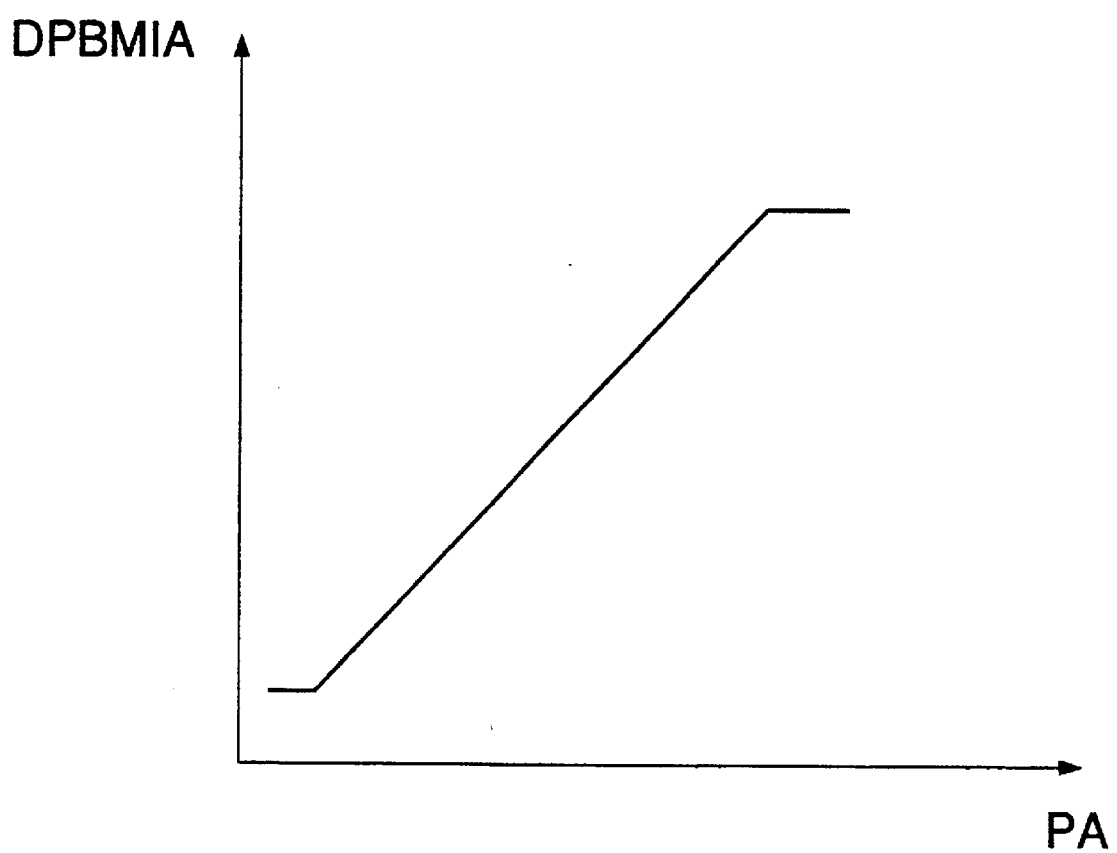
FIG. 6 shows a table for determining a parameter to be used in the FIG. 5 processing.

At the step S111a, a DPBMIA table is retrieved according to the detected atmospheric pressure PA to determine a predetermined pressure value DPBMIA. Then, it is determined at the step S112a whether or not a pressure difference PBG (i.e. PA−PBA) between the intake pipe absolute pressure PBA and the atmospheric pressure PA is greater than the predetermined pressure value DPBMIA. The DPBMIA table is set as shown in FIG. 6, such that a larger value of the predetermined pressure DPBMIA is read out as the atmospheric pressure PA increases.

If PBG>DPBMIA holds, the program proceeds to the step S113 in FIG. 3B, whereas if PBG≦DPBMIA holds, the program proceeds to the step S117 in FIG. 3B.

According to the variation of FIG. 5 as well, execution of the abnormality determination is inhibited when the clutch of a manual transmission-type vehicle is in a half-engaged state, to thereby prevent an erroneous determination as to abnormality in the idling rotational speed control system.

As described above, according to the invention, a determination as to abnormality in the idling rotational speed control system is inhibited when the brake system of the vehicle is operated, the throttle valve opening exceeds a predetermined value, the intake pressure exceeds a predetermined pressure value, or the air-fuel ratio correction amount falls outside a predetermined range. As a result, an erroneous determination ascribable to an increase in the engine rotational speed NE caused by pumping brake or slight opening of the throttle valve, etc., can be prevented, achieving a more accurate abnormality determination.

What is claimed is:

1. An idling rotational speed control system for an internal combustion engine installed in a vehicle having a brake system, said engine having an intake system, an exhaust system, a throttle valve arranged in said intake system, and air-fuel ratio-correcting means for correcting an air-fuel ratio of an air-fuel mixture supplied to said engine in a feedback manner responsive to an output from said air-fuel ratio sensor, by using an air-fuel ratio correction amount calculated according to said output from said air-fuel ratio sensor, the idling rotational speed control system comprising:

engine rotational speed-detecting means for detecting rotational speed of said engine;

rotational speed control means operable during idling of said engine, for controlling said rotational speed of said engine to a desired value in a feedback manner responsive to said rotational speed of said engine detected by said engine rotational speed-detecting means;

abnormality-determining means for determining whether said idling rotational speed control system is abnormal, based on said rotational speed of said engine detected by said engine rotational speed-detecting means, and a control parameter used by said rotational speed control means;

brake system operation-detecting means for detecting operation of said brake system; and inhibiting means operable when at least one of conditions is satisfied that said brake system is operated, and said air-fuel ratio correction amount falls outside a predetermined range, for inhibiting abnormality determination by said abnormality-determining means.

2. An idling rotational speed control system as claimed in claim 1, wherein said condition that said brake system is operated is satisfied when said brake system is repeatedly alternately operated and stopped.

3. An idling rotational speed control system as claimed in claim 1, wherein said condition that said air-fuel ratio correction amount falls outside said predetermined range is satisfied when said air-fuel ratio correction amount has continuously remained outside a range defined by predetermined upper and lower limit values over a predetermined time period.

4. An idling rotational speed control system for an internal combustion engine installed in a vehicle having a brake system, said engine having an intake system, an exhaust system, a throttle valve arranged in said intake system, an air-fuel ratio-correcting means for correcting an air-fuel ratio of an air-fuel mixture supplied to said engine in a feedback manner responsive to an output from said air-fuel ratio sensor, by using an air-fuel ratio correction amount calculated according to said output from said air-fuel ratio sensor, the idling rotational speed control system comprising:

engine rotational speed-detecting means for detecting rotational speed of said engine;

rotational speed control means operable during idling of said engine, for controlling said rotational speed of said engine to a desired value in a feedback manner responsive to said rotational speed of said engine detected by said engine rotational speed-detecting means;

abnormality-determining means for determining whether said idling rotational speed control system is abnormal, based on said rotational speed of said engine detected by said engine rotational speed-detecting means, and a control parameter used by said rotational speed control means;

at least one of brake system operation-detecting means for detecting operation of said brake system, and intake pressure-detecting means for detecting intake pressure in said intake system at a location downstream of said throttle valve; and inhibiting means operable when at least one of conditions is satisfied that said brake system is operated, said intake pressure exceeds a predetermined value, and said air-fuel ratio correction amount falls outside a predetermined range, for inhibiting abnormality determination by said abnormality-determining means.

5. An idling rotational speed control system as claimed in claim 4, wherein said condition that said brake system is operated is satisfied when said brake system is repeatedly alternately operated and stopped.

6. An idling rotational speed control system as claimed in claim 4, wherein said condition that said air-fuel ratio correction amount falls outside said predetermined range is satisfied when said air-fuel ratio correction amount has continuously remained outside a range defined by predetermined upper and lower limit values over a predetermined time period.

7. An idling rotational speed control system as claimed in claim 4, wherein said vehicle includes an automatic transmission having a clutch, said predetermined value of said intake pressure being a lower limit value assumed when said clutch is in a half-engaged state.

8. An idling rotational speed control system as claimed in claim 7, wherein said predetermined value of said intake pressure is set to a larger value as atmospheric pressure increases.

9. An idling rotational speed control system for an internal combustion engine installed in a vehicle having a brake system, said engine having an intake system, an exhaust system, a throttle valve arranged in said intake system, and air-fuel ratio-correcting means for correcting an air-fuel ratio of an air-fuel mixture supplied to said engine in a feedback manner responsive to an output from said air-fuel ratio sensor, by using an air-fuel ratio correction amount calculated according to said output from said air-fuel ratio sensor, the idling rotational speed control system comprising:

engine rotational speed-detecting means for detecting rotational speed of said engine;

rotational speed control means operable during idling of said engine, for controlling said rotational speed of said engine to a desired value in a feedback manner responsive to said rotational speed of said engine detected by said engine rotational speed-detecting means;

abnormality-determining means for determining whether said idling rotational speed control system is abnormal, based on said rotational speed of said engine detected by said engine rotational speed-detecting means, and a control parameter used by said rotational speed control means;

at least one of brake system operation-detecting means for detecting operation of said brake system, and throttle valve opening-detecting means for detecting opening of said throttle valve; and inhibiting means operable when at least one of conditions is satisfied that said brake system is operated, said opening of said throttle valve exceeds a predetermined value, and said air-fuel ratio correction amount falls outside a predetermined range, for inhibiting abnormality determination by said abnormality-determining means, wherein said condition that said brake system is operated is satisfied when said brake system is repeatedly alternately operated and stopped.

10. An idling rotational speed control system for an internal combustion engine installed in a vehicle having a brake system, said engine having an intake system, an exhaust system, a throttle valve arranged in said intake system, and air-fuel ratio-correcting means for correcting an air-fuel ratio of an air-fuel mixture supplied to said engine in a feedback manner responsive to an output from said air-fuel ratio sensor, by using an air-fuel ratio correction amount calculated according to said output from said air-fuel ratio sensor, the idling rotational speed control system comprising:

engine rotational speed-detecting means for detecting rotational speed of said engine;

rotational speed control means operable during idling of said engine, for controlling said rotational speed of said engine to a desired value in a feedback manner responsive to said rotational speed of said engine detected by said engine rotational speed-detecting means;

abnormality-determining means for determining whether said idling rotational speed control system is abnormal, based on said rotational speed of said engine detected by said engine rotational speed-detecting means, and a control parameter used by said rotational speed control means;

at least one of brake system operation-detecting means for detecting operation of said brake system, and throttle valve opening-detecting means for detecting opening of said throttle valve; and inhibiting means operable when at least one of conditions is satisfied that said brake system is operated, said opening of said throttle valve exceeds a predetermined value, and said air-fuel ratio correction amount falls outside a predetermined range, for inhibiting abnormality determination by said abnormality-determining means, wherein said predetermined value of said opening of said throttle valve is a value at which said rotational speed of said engine becomes substantially equal to a predetermined upper threshold value used for determining abnormality of said idling rotational speed control system.

11. An idling rotational speed control system for an internal combustion engine installed in a vehicle having a brake system, said engine having an intake system, an exhaust system, a throttle valve arranged in said intake system, and air-fuel ratio-correcting means for correcting an air-fuel ratio of an air-fuel mixture supplied to said engine in a feedback manner responsive to an output from said air-fuel ratio sensor, by using an air-fuel ratio correction amount calculated according to said output from said air-fuel ratio sensor, the idling rotational speed control system comprising:

engine rotational speed-detecting means for detecting rotational speed of said engine;

rotational speed control means operable during idling of said engine, for controlling said rotational speed of said engine to a desired value in a feedback manner responsive to said rotational speed of said engine detected by said engine rotational speed-detecting means;

abnormality-determining means for determining whether said idling rotational speed control system is abnormal, based on said rotational speed of said engine detected by said engine rotational speed-detecting means, and a control parameter used by said rotational speed control means;

at least one of brake system operation-detecting means for detecting operation of said brake system, and throttle valve opening-detecting means for detecting opening of said throttle valve; and inhibiting means operable when at least one of conditions is satisfied that said brake system is operated, said opening of said throttle valve exceeds a predetermined value, and said air-fuel ratio correction amount falls outside a predetermined range, for inhibiting abnormality determination by said abnormality-determining means, wherein said condition that said air-fuel ratio correction amount falls outside said predetermined range is satisfied when said air-fuel ratio correction amount has continuously remained outside a range defined by predetermined upper and lower limit values over a predetermined time period.

12. An idling rotational speed control system for an internal combustion engine installed in a vehicle having a brake system, said engine having an intake system, an exhaust system, a throttle valve arranged in said intake system, an air-fuel ratio-correcting means for correcting an air-fuel ratio of an air-fuel mixture supplied to said engine in a feedback manner responsive to an output from said air-fuel ratio sensor, by using an air-fuel ratio correction amount calculated according to said output from said air-fuel ratio sensor, the idling rotational speed control system comprising:

engine rotational speed-detecting means for detecting rotational speed of said engine;

rotational speed control means operable during idling of said engine, for controlling said rotational speed of said engine to a desired value in a feedback manner responsive to said rotational speed of said engine detected by said engine rotational speed-detecting means;

abnormality-determining means for determining whether said idling rotational speed control system is abnormal, based on said rotational speed of said engine detected by said engine rotational speed-detecting means, and a control parameter used by said rotational speed control means;

at least one of brake system operation-detecting means for detecting operation of said brake system, throttle valve opening-detecting means for detecting opening of said throttle valve, and intake pressure-detecting means for detecting intake pressure in said intake system at a location downstream of said throttle valve; and inhibiting means operable when at least one of conditions is satisfied that said brake system is operated, said intake pressure exceeds a predetermined value, said opening of said throttle valve exceeds a predetermined value, and said air-fuel ratio correction amount falls outside a predetermined range, for inhibiting abnormality determination by said abnormality-determining means, wherein said condition that said brake system is operated is satisfied when said brake system is repeatedly alternately operated and stopped.

13. An idling rotational speed control system for an internal combustion engine installed in a vehicle having a brake system, said engine having an intake system, an exhaust system, a throttle valve arranged in said intake system, an air-fuel ratio-correcting means for correcting an air-fuel ratio of an air-fuel mixture supplied to said engine in a feedback manner responsive to an output from said air-fuel ratio sensor, by using an air-fuel ratio correction amount calculated according to said output from said air-fuel ratio sensor, the idling rotational speed control system comprising:

engine rotational speed-detecting means for detecting rotational speed of said engine;

rotational speed control means operable during idling of said engine, for controlling said rotational speed of said engine to a desired value in a feedback manner responsive to said rotational speed of said engine detected by said engine rotational speed-detecting means;

abnormality-determining means for determining whether said idling rotational speed control system is abnormal, based on said rotational speed of said engine detected by said engine rotational speed-detecting means, and a control parameter used by said rotational speed control means;

at least one of brake system operation-detecting means for detecting operation of said brake system, throttle valve opening-detecting means for detecting opening of said throttle valve, and intake pressure-detecting means for detecting intake pressure in said intake system at a location downstream of said throttle valve; and inhibiting means operable when at least one of conditions is satisfied that said brake system is operated, said intake pressure exceeds a predetermined value, said opening of said throttle valve exceeds a predetermined value, and said air-fuel ratio correction amount falls outside a predetermined range, for inhibiting abnormality determination by said abnormality-determining means, wherein said predetermined value of said opening of said throttle valve is a value at which said rotational speed of said engine becomes substantially equal to a predetermined upper threshold value used for determining abnormality of said idling rotational speed control system.

14. An idling rotational speed control system for an internal combustion engine installed in a vehicle having a brake system, said engine having an intake system, an exhaust system, a throttle valve arranged in said intake system, an air-fuel ratio-correcting means for correcting an air-fuel ratio of an air-fuel mixture supplied to said engine in a feedback manner responsive to an output from said air-fuel ratio sensor, by using an air-fuel ratio correction amount calculated according to said output from said air-fuel ratio sensor, the idling rotational speed control system comprising:

engine rotational speed-detecting means for detecting rotational speed of said engine;

rotational speed control means operable during idling of said engine, for controlling said rotational speed of said engine to a desired value in a feedback manner responsive to said rotational speed of said engine detected by said engine rotational speed-detecting means;

abnormality-determining means for determining whether said idling rotational speed control system is abnormal, based on said rotational speed of said engine detected by said engine rotational speed-detecting means, and a control parameter used by said rotational speed control means;

at least one of brake system operation-detecting means for detecting operation of said brake system, throttle valve opening-detecting means for detecting opening of said throttle valve, and intake pressure-detecting means for detecting intake pressure in said intake system at a location downstream of said throttle valve; and inhibiting means operable when at least one of conditions is satisfied that said brake system is operated, said intake pressure exceeds a predetermined value, said opening of said throttle valve exceeds a predetermined value, and said air-fuel ratio correction amount falls outside a predetermined range, for inhibiting abnormality determination by said abnormality-determining means, wherein said condition that said air-fuel ratio correction amount falls outside said predetermined range is satisfied when said ratio correction amount has continuously remained outside a range defined by predetermined upper and lower limit values over a predetermined time period.

15. An idling rotational speed control system for an internal combustion engine installed in a vehicle having a brake system, said engine having an intake system, an exhaust system, a throttle valve arranged in said intake system, an air-fuel ratio-correcting means for correcting an air-fuel ratio of an air-fuel mixture supplied to said engine in a feedback manner responsive to an output from said air-fuel ratio sensor, by using an air-fuel ratio correction amount calculated according to said output from said air-fuel ratio sensor, the idling rotational speed control system comprising:

engine rotational speed-detecting means for detecting rotational speed of said engine;

rotational speed control means operable during idling of said engine, for controlling said rotational speed of said engine to a desired value in a feedback manner responsive to said rotational speed of said engine detected by said engine rotational speed-detecting means;

abnormality-determining means for determining whether said idling rotational speed control system is abnormal, based on said rotational speed of said engine detected by said engine rotational speed-detecting means, and a control parameter used by said rotational speed control means;

at least one of brake system operation-detecting means for detecting operation of said brake system, throttle valve opening-detecting means for detecting opening of said throttle valve, and intake pressure-detecting means for detecting intake pressure in said intake system at a location downstream of said throttle valve; and inhibiting means operable when at least one of conditions is satisfied that said brake system is operated, said intake pressure exceeds a predetermined value, said opening of said throttle valve exceeds a predetermined value, and said air-fuel ratio correction amount falls outside a predetermined range, for inhibiting abnormality determination by said abnormality-determining means, wherein said vehicle includes an automatic transmission having a clutch, said predetermined value of said intake pressure being a lower limit value assumed when said clutch is in a half-engaged state.

16. An idling rotational speed control system as claimed in claim 15, wherein said predetermined value of said intake pressure is set to a larger value as atmospheric pressure increases.

* * * * *